(No Model.)
T. A. EDISON.
INCANDESCENT ELECTRIC LAMP.
No. 358,599. Patented Mar. 1, 1887.
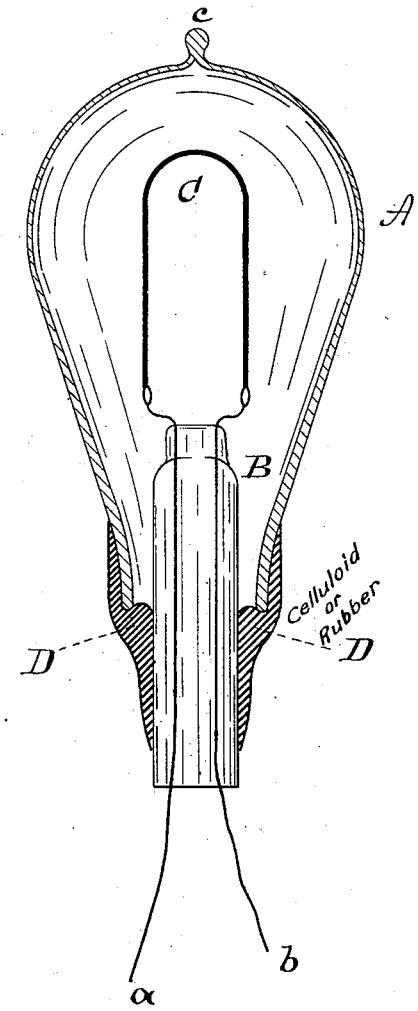
WITNESSES:
INVENTOR:
T. A. Edison
BY Dyer & Wilber
ATTORNEYS.

United States Patent Office.

THOMAS A. EDISON, OF MENLO PARK, NEW JERSEY, ASSIGNOR TO THE EDISON ELECTRIC LIGHT COMPANY, OF NEW YORK, N. Y.

INCANDESCENT ELECTRIC LAMP.

SPECIFICATION forming part of Letters Patent No. 358,599, dated March 1, 1887.

Application filed November 28, 1881. Serial No. 46,754. (No model.)

*To all whom it may concern:*

Be it known that I, THOMAS A. EDISON, of Menlo Park, in the county of Middlesex and State of New Jersey, have invented a new and useful Improvement in Incandescing Electric Lamps, (Case No. 363;) and I do hereby declare that the following is a full and exact description of the same, reference being had to the accompanying drawing and to the letters of reference marked thereon.

The object I have in view is to produce a simple and efficient means for joining the two glass parts of an incandescing electric lamp, so that when the carbon breaks said parts can be readily separated and used again.

In carrying out my invention I support the bulb or globe and unite the same with the tubular wire-support before the globe is exhausted, by means of a cement or other material or substance which is sufficiently plastic to permit of its being molded or formed upon the parts at the joint or is capable of being made plastic by heat or otherwise, and which hardens or can be hardened when in position, so as to hold the parts firmly together, and which, further, is of such nature that it will adhere to the glass surfaces of the two parts of the lamp and will form an air-tight joint. For this purpose I prefer to use celluloid or rubber, either of which can be applied in a plastic condition and molded over the joint around the bottom of the globe and then hardened, the celluloid being hardened by exposure and the rubber by vulcanization.

The drawing represents in vertical section a lamp constructed in this manner.

A is the glass inclosing bulb or globe.

B is the tubular glass wire and carbon support.

C is the incandescing conductor, (preferably a filament of carbon,) and $a\,b$ are the leading-in wires.

D represents the joint between the globe and wire-support, which is molded or formed of celluloid or rubber applied in a soft or plastic condition, and, if rubber it will, then be vulcanized.

This material is not only applied to form an air-tight joint between the globe and the wire-support, but is made to inclose the bottom edge of the globe, as shown, and forms the only means for uniting the two parts and supporting the globe upon the glass wire-support.

As before stated, other suitable substances or materials could be used instead of celluloid or rubber, such as any resinous cement which will adhere to the surface of the glass parts. After this joint is formed, the globe is exhausted and sealed off at $c$.

What I claim is—

In an incandescent electric lamp, the combination, with the open-mouthed glass globe and the glass wire-support entering centrally the mouth of said globe, of a hardened plastic material applied to the outside both of the wire-support and of the globe, forming an air-tight joint between them, substantially as set forth.

This specification signed and witnessed this 29th day of October, 1881.

THOS. A. EDISON.

Witnesses:
RICHD. N. DYER,
H. W. SEELY.